Oct. 26, 1965

G. McCONEGHY, JR., ETAL 3,214,051

SELF-UNLOADING WAGON

Filed Dec. 17, 1962

Inventors
George McConeghy, Jr.
Harvey O. Halstensgard

Attorney

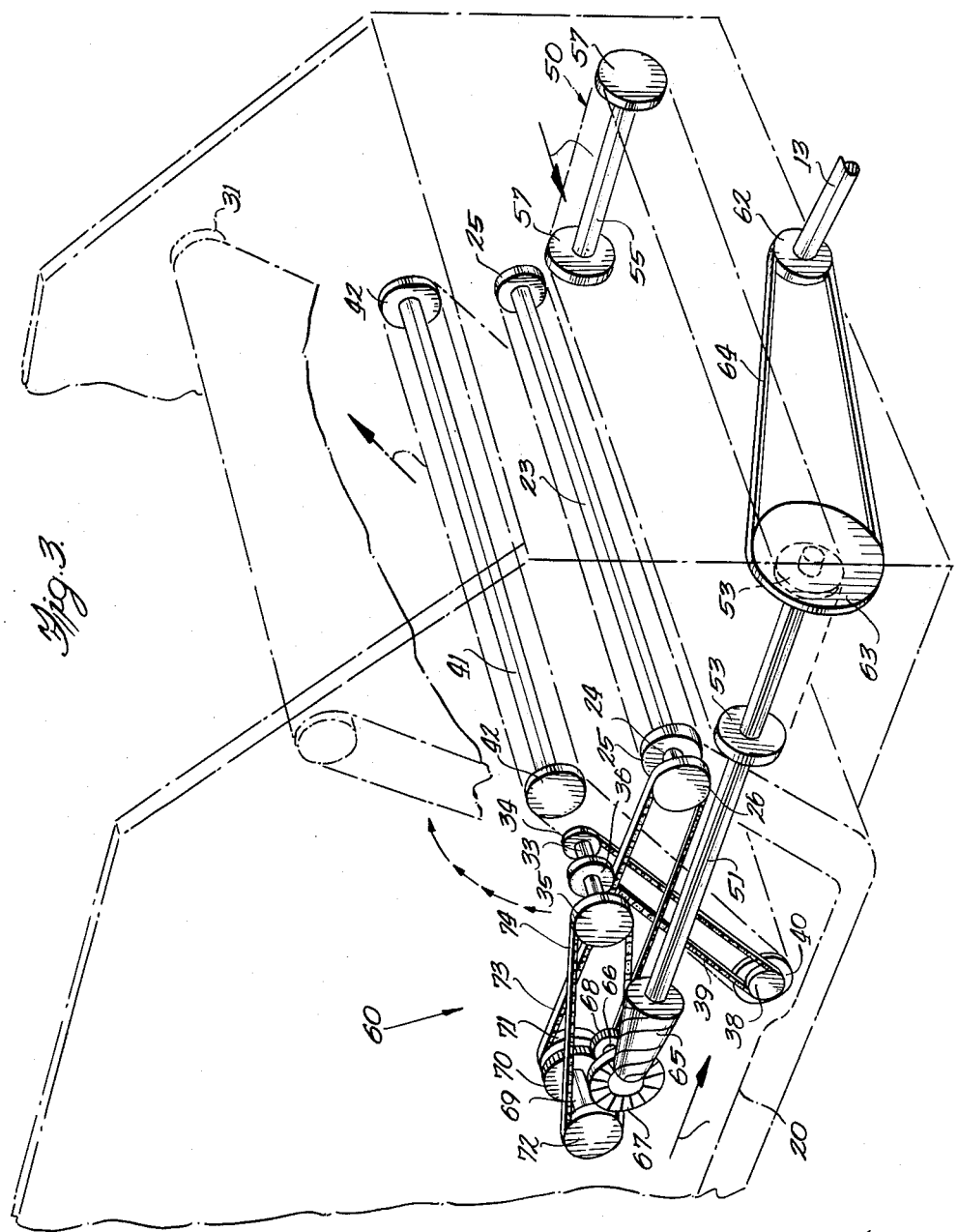

3,214,051
SELF-UNLOADING WAGON
George McConeghy, Jr., Oakville, Ontario, Canada, and Harvey O. Halstensgard, Berwyn, Ill., assignors to International Harvester Company, Chicago, Ill., a corporation of New Jersey
Filed Dec. 17, 1962, Ser. No. 244,985
10 Claims. (Cl. 214—522)

The present invention relates generally to improvements in self-unloading vehicles and the like, and more particularly to a new and improved self-unloading random stacked wagon that is capable of unloading bales, wafers, grain and forage. Those concerned with the development of self-unloading wagons have long recognized the need for an all-purpose wagon that can unload random stacked bales and wafers as well as forage and grain. The present invention fulfills this need.

The general purpose of this invention is to provide a self-unloading wagon which embraces all the advantages of similarly employed wagons and possesses none of the disadvantages. To attain this the present invention contemplates a unique swingable inclined conveyor overlying an extension of the bed conveyor wherein the angle of inclination of said inclined conveyor can be adjusted such that it will be suitable for the material being unloaded.

An object of the present invention is the provision of a self-unloading wagon that can unload random stacked bales, wafers, forage or grain.

Another object is the provision of a self-unloading wagon having an inclined conveyor that can be positioned at a plurality of angles.

These and other objects of the invention will become more apparent from the specification and drawings wherein:

FIGURE 3 is a schematic view of the wagon drive mechanism.

Figure 1:
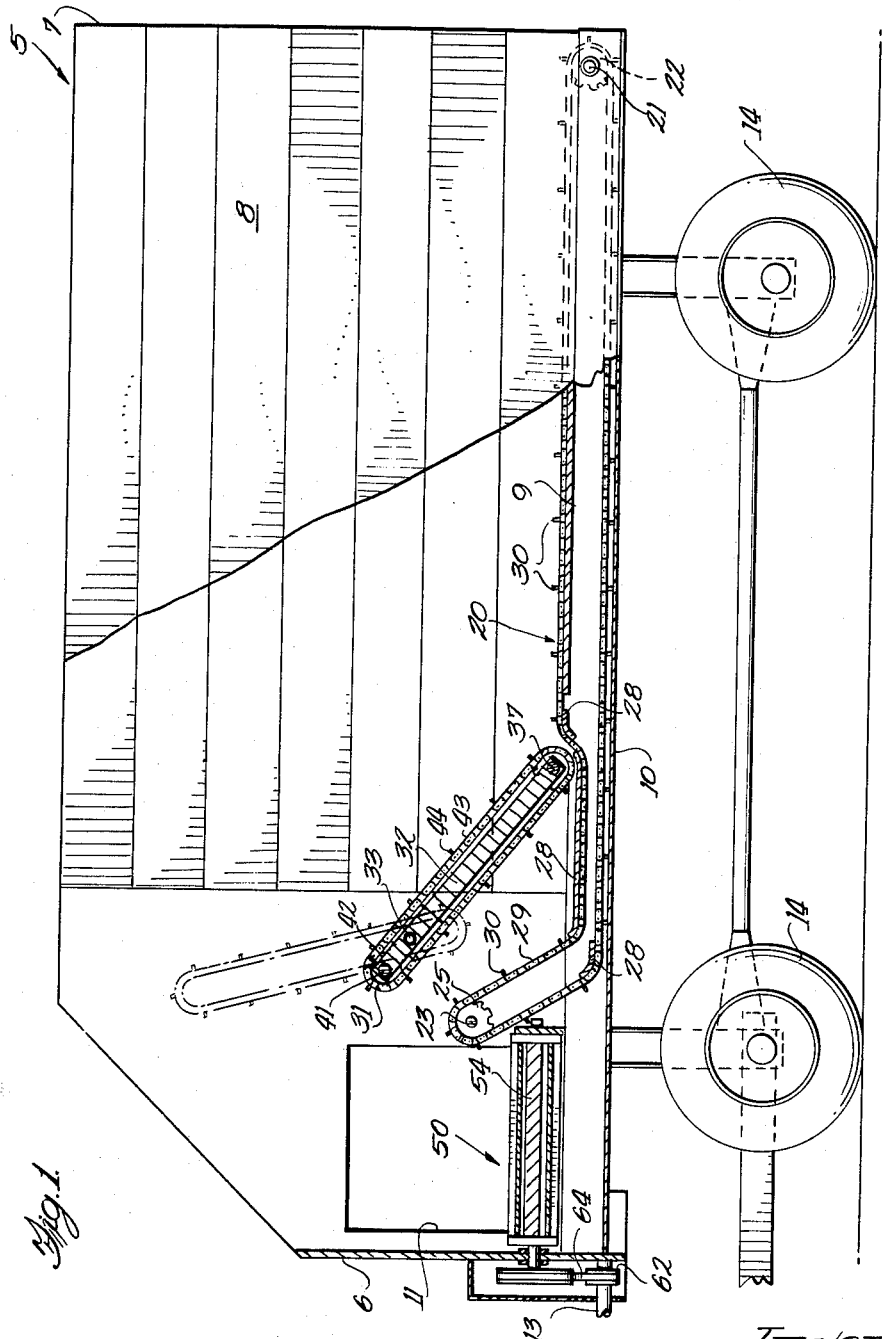
FIGURE 1 is an elevation view partially in section of the wagon.

Referring now to the drawings whereby like reference characters designate like or corresponding parts throughout the several views there is shown in FIGURE 1 the self-unloading wagon generally designated 5 having a front 6, back 7, and connecting sides 8.

As can be best seen in FIGURE 1, the wagon 5 has a first bottom 9 and a second bottom 10 which is continuous over the entire wagon. One of the sides 8 is provided with a discharge opening 11 through which the cross conveyor 50 extends. The embodiment of the wagon, as illustrated, is provided with a tongue 12, an input shaft 13 which is normally driven by a power takeoff shaft of the tractor, and wheels 14.

Figure 2:
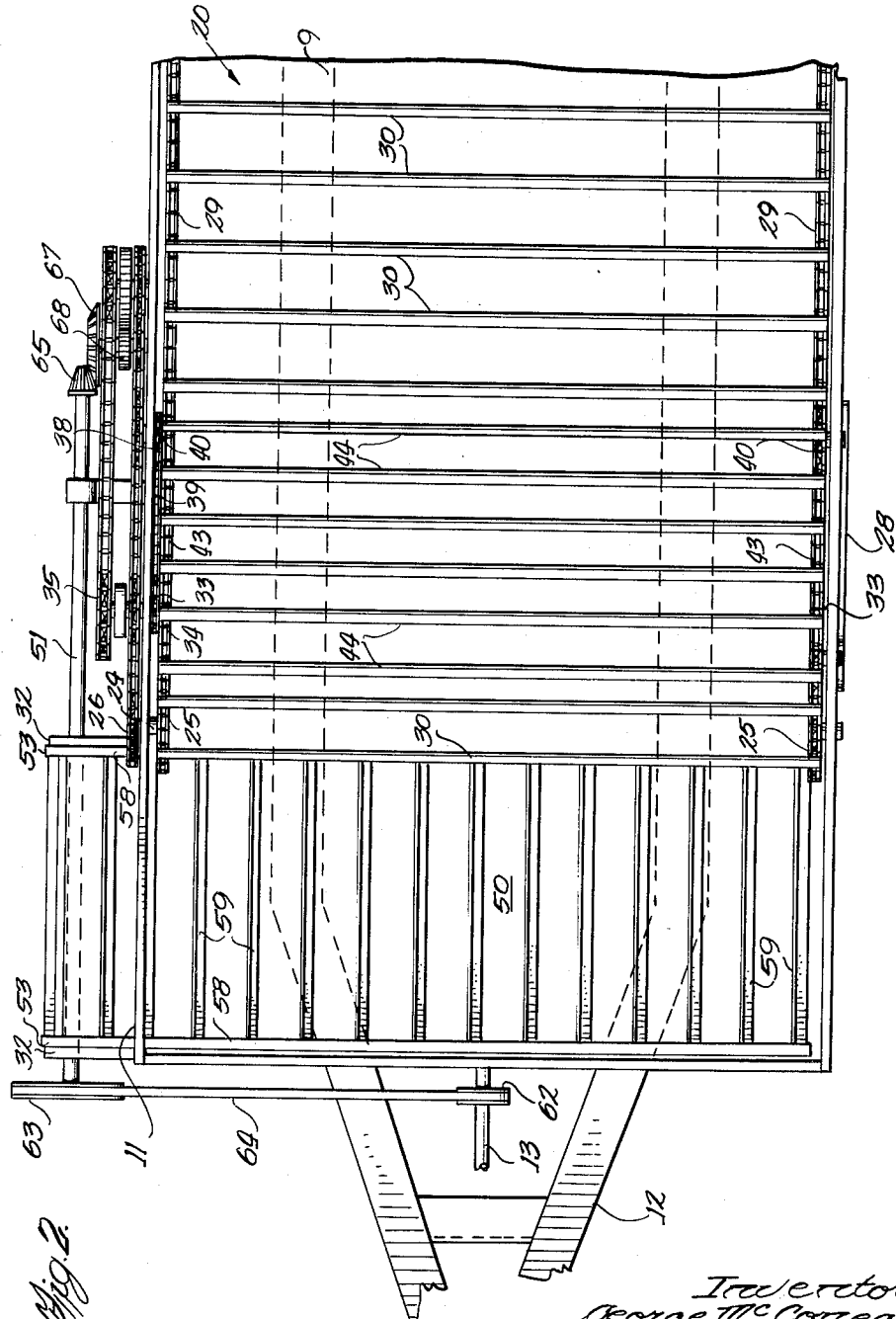
FIGURE 2 is a plan view of the wagon.

Referring now to FIGURE 2, the wagon is provided with a bed conveyor 20, a swingable inclined conveyor 31 and a cross conveyor 50. The bed conveyor 20 comprises a rear shaft 21 journalled in the sides 8 of the wagon having a pair of sprockets 22 mounted thereon adjacent said sides 8. The bed conveyor also includes a front shaft 23 mounted in the sides 8 of the wagon and having an end portion 24 extending through one side of the wagon. A pair of sprockets 25 are secured to said front shaft internally of the wagon and in alignment with the sprockets 22 of said rear shaft 21. A drive sprocket 26 is secured to said front shaft 23 externally of the wagon on said end portion 24.

As can be best seen in FIGURE 1, the bed conveyor 20 dips downwardly, extends horizontally a short distance, and then inclines upwardly towards the front of the wagon. This dip is facilitated by guides 28. A pair of endless chains 29 having connecting slats 30 extend over the sprockets 22 of the rear shaft, sprockets 25 of the front shaft and between the guides 28 thus forming the bed conveyor 20.

The inclined conveyor 31 is made up of a slab 32 secured to a pivot shaft 33 which is mounted in the sides 8 by bearings 36. Said pivot shaft 33 has an idler sprocket 34 secured thereto internally of the wagon and a drive sprocket 35 secured thereto externally of the wagon. The slab 32 of the inclined conveyor has a first shaft 37 journalled therein adjacent one of its ends having a drive sprocket 38 secured to said first shaft in alignment with the idler sprocket 34 of said pivot shaft. An endless chain 39 connects the drive sprocket 38 of the first shaft to the idler sprocket 34 of the pivot shaft and said first shaft is thereby driven. Said first shaft also has secured thereto a pair of sprockets 40. The slab 32 has a second shaft 41 journalled therein adjacent its opposite end. Said second shaft 41 has a pair of sprockets 42 in alignment with sprockets 40 of said first shaft and endless chains 43 having connecting slats 44 are mounted on said sprockets 40 and 42. The inclined conveyor can be pivoted about its pivot shaft 33 such that it assumes two positions, one shown in full lines and the second position shown in broken lines in FIGURES 1 and 3. It should be noted that the full line position of FIGURES 1 and 3 is utilized when unloading bales or wafers and that the broken line position is utilized when unloading forage or grain. Also it should be noted that in both positions of the inclined conveyor there is an opening between said inclined conveyor and said bed conveyor. The opening being larger at the steep angle than at the shallow angle. The upper edge of the inclined conveyor in both positions is rearwardly of the forward edge of the bed conveyor.

The cross conveyor 50 extends through discharge opening 11 formed in the side of the wagon and includes longitudinal drive shaft 51 which is supported externally of the wagon by bearing mounts 32. A slab or bottom 54 is provided transversely across the front end of the wagon having its upper edge slightly above said longitudinal drive shaft 51. A pair of sprockets 53 are secured to said longitudinal drive shaft 51 adjacent the edges of said slab or bottom 54. A short shaft 55 is mounted in bearings adjacent the other side of the wagon and has mounted thereon sprockets 57 in alignment with sprockets 53. A pair of endless chains 58 having connecting slats 59 are mounted over said sprockets 53 and 57 to form the cross conveyor 50.

The drive mechanism 60 for the system of conveyors is best illustrated in FIGURE 3. The input shaft 13 of the wagon has secured thereto a pulley 62 which is in alignment with the pulley 63 mounted on the forward end of longitudinal drive shaft 51, said pulleys being connected by a V-belt 64. This V-belt connection between input shaft 13 and longitudinal drive shaft 51 thus drives the cross conveyor 50. On the opposite end of said longitudinal drive shaft 51 is secured a bevel gear 65 which meshes with a second bevel gear 67 which is secured to a first stub shaft 66. Said first stub shaft 66 also has secured thereto a first spur gear 68 which meshes with a second spur gear 70 which is secured to a second stub shaft 69. The second stub shaft 69 has secured thereto a bed conveyor drive sprocket 71 and an inclined conveyor drive sprocket 72. A bed conveyor endless chain 73 connects bed conveyor drive sprocket 71 to the drive sprocket 26 of the bed conveyor. An inclined conveyor endless chain 74 connects the inclined conveyor drive sprocket 72 to the drive sprocket 35 of the inclined conveyor 31. Different size sprockets 72 and 35 for driving the inclined conveyor are used in order to vary the speed of the inclined conveyor with respect to the constant speed of the bed conveyor.

Operation

When the wagon is to be used for unloading randomly stacked bales the inclined conveyor is located at a shallow angle position as shown in full lines in FIGURES 1 and 3, and the sprockets 72 and 35 are sized such that the inclined conveyor will be moving at its slowest speed. The angle of inclination of the inclined conveyor in this position is approximately 40° at which angle the inclined conveyor functions to draw off or separate a portion from the mass of randomly stacked bales and deposits the drawn off bales onto the cross conveyor without destroying the bales. Any loose material remaining in the wagon can travel on the bed conveyor between the inclined conveyor and the bed conveyor to be deposited on the cross conveyor 50.

When the wagon is to be used for forage or grain the inclined conveyor is pivoted into the position shown in broken lines of FIGURES 1 and 3 and the sprockets 72 and 35 are sized such that the inclined conveyor will be driven at a high speed. In this position of the inclined conveyor a substantially large opening is provided between the lower edge of the inclined conveyor and the bed conveyor and material can be conveyed through this opening directly from the bed conveyor to the cross conveyor. Material will also be conveyed up the steep angle of the inclined conveyor and over its top. The inclined conveyor in this position also functions as a beater to dislodge and break up the compacted material from the mass as it is conveyed forwardly by the bed conveyor.

Thus it is seen that the self-unloading wagon, as provided, can be easily adapted to use with any type of material.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A self unloading wagon for such materials as forage, hay wafers, and random stacked bales, comprising: a chassis; wheels supporting said chassis; a wagon body on said chassis, said body having a discharge end; an endless, flat bed conveyor in said body operable to move said material toward said discharge end; an endless, flat inclined beater-elevator conveyor in said body; means mounting said beater-elevator conveyor on said body, said mounting means being adjustable to position said beater-elevator conveyor at a moderate angle of incline of about forty degrees relative to said bed conveyor for discharging bales and at a steep angle of incline relative to said bed conveyor for stripping forage, said beater-elevator conveyor being operable to move material toward said discharge end when set at said moderate angle of incline; an endless, flat cross conveyor in said body extending transversely to said beater-elevator conveyor at the discharge end thereof and below the upper end thereof; power supply means connected to each of said conveyors, said power supply means driving said beater-elevator conveyor at low speed when said beater-elevator conveyor is set at said moderate, bale-handling angle and at high speed when said beater-elevator conveyor is set at said steep, forage-handling angle.

2. A self unloading wagon as recited in claim 1, wherein: said bed conveyor dips at a point therealong and then rises to a terminal point closely adjacent said cross conveyor and discharges thereon; and the lower end of said beater-elevator conveyor is located closely adjacent said dip when said beater-elevator conveyor is set at said moderate angle of incline.

3. A self unloading wagon as recited in claim 2, wherein: said cross conveyor is located generally above said bed conveyor and said rise in said bed conveyor extends upwardly in the vicinity of said terminal point thereof to discharge onto said cross conveyor.

4. A self unloading wagon as recited in claim 1, wherein: said mounting means for said inclined beater-elevator conveyor is pivot means adjacent one end thereof about which said beater-elevator conveyor is swingable from a first position where said beater-elevator conveyor is at said moderate angle and the lower end thereof is close to said bed conveyor to a second position where said beater-elevator conveyor is at said steep angle and the lower end thereof is remote from said bed conveyor.

5. A self unloading wagon for such materials as forage, hay wafers, and random stacked bales, comprising: a chassis; wheels supporting said chassis; a wagon body on said chassis, said body having a discharge end; an endless, flat bed conveyor in said body operable to move said material toward said discharge end; an endless, flat inclined beater-elevator conveyor in said body; means mounting said beater-elevator conveyor on said body, said mounting means being adjustable to position said beater-elevator conveyor at a moderate angle of incline of less than forty degrees relative to said bed conveyor for discharging bales and at a steep angle of incline relative to said bed conveyor for stripping forage, said beater-elevator conveyor being operable to move material toward said discharge end when set at said moderate angle of incline; an endless, flat cross conveyor in said body extending transversely to said beater-elevator conveyor at the discharge end thereof and below the upper end thereof; power supply means connected to each of said conveyors, said power supply means driving said beater-elevator conveyor at low speed when said beater-elevator conveyor is set at said moderate, bale-handling angle and at high speed when said beater-elevator conveyor is set at said steep, forage-handling angle.

6. A self unloading wagon as recited in claim 5, wherein: said bed conveyor dips at a point therealong and then rises to a terminal point closely adjacent said cross conveyor and discharges thereon; and the lower end of said beater-elevator conveyor is located closely adjacent said dip when said beater-elevator conveyor is set at said moderate angle of incline.

7. A self unloading wagon as recited in claim 6, wherein: said cross conveyor is located generally above said bed conveyor and said rise in said bed conveyor extends upwardly in the vicinity of said terminal point thereof to discharge onto said cross conveyor.

8. A self unloading wagon as recited in claim 5, wherein: said mounting means for said inclined beater-elevator conveyor is pivot means adjacent one end thereof about which said beater-elevator conveyor is swingable from a first position where said beater-elevator conveyor is at said moderate angle and the lower end thereof is close to said bed conveyor to a second position where said beater-elevator conveyor is at said steep angle and the lower end thereof is remote from said bed conveyor.

9. A self unloading wagon for such materials as forage, hay wafers, and random stacked bales, comprising: a chassis; wheels supporting said chassis; a wagon body on said chassis, said body having a discharge end; an endless, flat bed conveyor in said body operable to move said material towards said discharge end; an endless, flat inclined beater-elevator conveyor in said body; means mounting said beater-elevator conveyor on said body, said mounting means being adjustable to position said beater-elevator conveyor at a moderate angle of incline of less than forty degrees relative to said bed conveyor for discharging bales and at a steep angle of incline relative to said bed conveyor for stripping forage, said beater-elevator conveyor being operable to move material toward said discharge end when set at said moderate angle of incline, the lower end of said beater-elevator conveyor being located closely adjacent said bed conveyor when set at said moderate angle of incline; an endless, flat cross conveyor in said body below the upper end of said inclined beater-elevator conveyor and at the terminal point of said bed conveyor, said cross conveyor being operable to move said material along a path transverse to said bed conveyor and being located to receive material discharged from at least one of said bed conveyor and said beater-elevator conveyor; power supply means connected to each of said conveyors, said power supply means driving said beater-elevator conveyor at low speed when said beater-elevator conveyor is set at said moderate, bale-handling angle of incline and at high speed when said beater-elevator conveyor is set at said steep, forage-handling angle of incline.

10. A self unloading wagon as recited in claim 9, wherein: said mounting means for said inclined beater-elevator conveyor comprises pivot means adjacent the upper end thereof with respect to said moderate angle of incline, said beater-elevator conveyor being swingable from a first position at said moderate angle wherein the lower end of said beater-elevator conveyor is located closely adjacent said bed conveyor to a second position at said steep angle wherein the lower end of said beater-elevator conveyor is remote from said bed conveyor.

References Cited by the Examiner
UNITED STATES PATENTS

| | | | |
|---|---|---|---|
| 2,438,301 | 3/48 | Schulte | 214—522 |
| 2,600,008 | 6/52 | Ludeking | 214—522 |
| 2,669,368 | 2/54 | Kammueller et al. | 214—522 |
| 2,717,703 | 9/55 | Kull et al. | 214—522 X |
| 2,771,203 | 11/56 | Collins et al. | 214—519 |
| 2,772,796 | 12/56 | Hansen | 214—519 X |
| 2,786,655 | 3/57 | Cowsert | 214—519 X |
| 2,885,209 | 5/59 | Bruecker | 214—83.36 X |

GERALD M. FORLENZA, *Primary Examiner.*

HUGO O. SCHULZ, *Examiner.*